Aug. 11, 1970  O. KRATKY ET AL  3,523,446

DEVICE FOR DENSITY DETERMINATION

Filed Feb. 7, 1968  3 Sheets-Sheet 1

INVENTORS
OTTO KRATKY
HANS LEOPOLD
HANS STABINGER

BY

ATTORNEY.

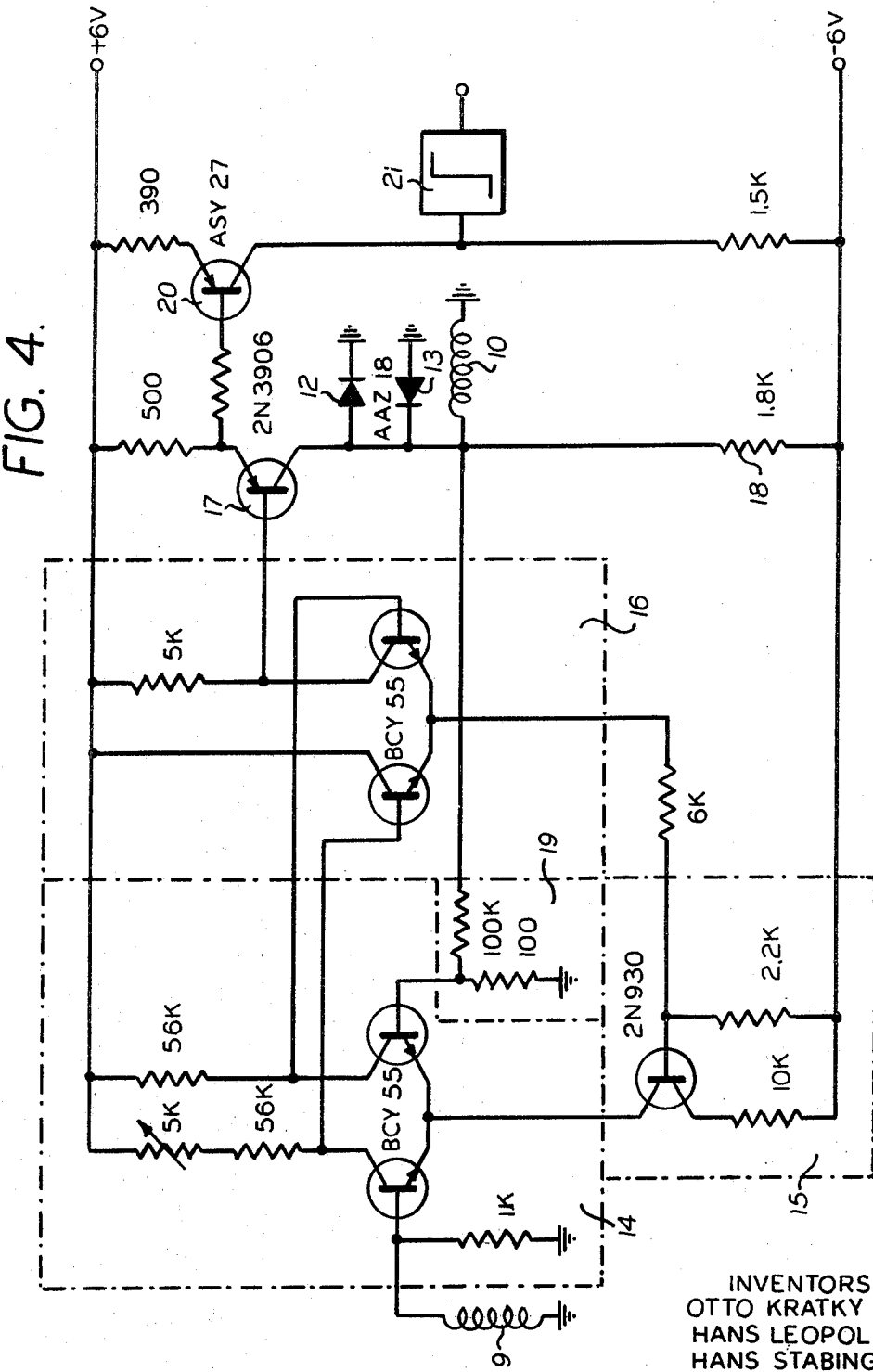

Aug. 11, 1970　　　O. KRATKY ET AL　　　3,523,446

DEVICE FOR DENSITY DETERMINATION

Filed Feb. 7, 1968　　　　　　　3 Sheets-Sheet 3

INVENTORS
OTTO KRATKY
HANS LEOPOLD
HANS STABINGER
BY
ATTORNEY.

United States Patent Office 3,523,446
Patented Aug. 11, 1970

3,523,446
DEVICE FOR DENSITY DETERMINATION
Otto Kratky, Leonhardgurtel 32, and Hans Leopold and Hans Stabinger, both of August-Musgergasse 4, all of Graz, Austria
Filed Feb. 7, 1968, Ser. No. 703,639
Claims priority, application Austria, Mar. 21, 1967, A 2,704/67; Aug. 4, 1967, A 7,282/67
Int. Cl. G01n 9/00
U.S. Cl. 73—32       4 Claims

ABSTRACT OF THE DISCLOSURE

An apparatus for density determination of objects, particularly of liquids and gases, comprising a mechanical oscillator having V-shaped elastic elements supporting a hollow member for holding the object to be measured and an excitation amplifier including circuit means for keeping the amplitude of the mechanical oscillator constant and including a D.C. coupled differential amplifier providing a high phase linearity response and including a feed back loop operative on the excitation amplifier by means of the mechanical oscillator.

---

Figure 1:
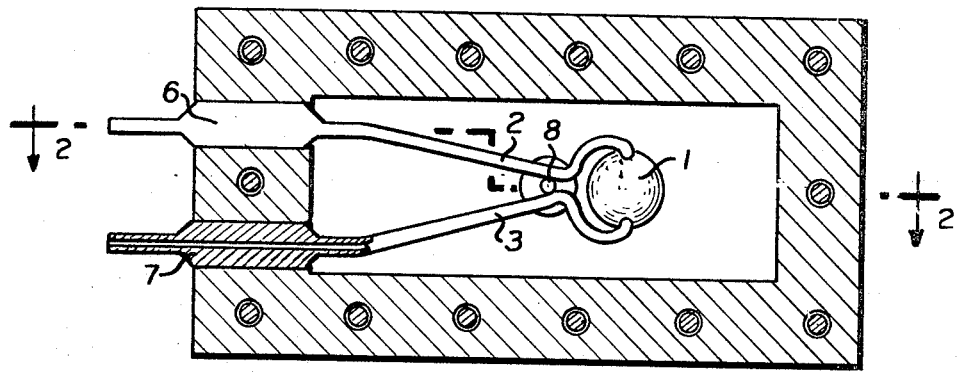

The present invention relates to a device for the determination of density, in general, and to a device for determining density especially of liquids and gases, in particular.

It is one object of the present invention to provide a device for density determination of the highest accuracy possible and which can use very small amounts of substances (of the order of 1 cm.$^3$) and viscous solutions. By measuring under the exclusion of air, the disturbing influence of the volatility of solvents is avoided. The density of small gas volumes is measured with the highest precision. The device measures continuously and records the density of flowing substances.

It is another object of the present invention to provide an apparatus for the determination of density with the highest accuracy possible, which device can function with very small quantities of substances (of the order of 1 cm.$^3$) and viscous solutions, wherein the resonant frequency of a mechanical oscillator is measured and within the oscillator contained the mass of the sample to be measured is contained.

If this method is to be used for process control, measures are desirable which guarantee a uniform, identical value for the calibration point of the density of water independent of the unavoidable variations of each oscillator. In this way it is possible, to read many densimeters even far away without providing for the individual calibration of each oscillator.

For digital calibration of the oscillator, pulses of constant phase relationship of the exciting voltage of the oscillator are scaled, whereby the time required for a preset number of pulses is taken as a measure of the density of the sample.

The preset number of pulses defines a proportional factor which determines the accuracy of the measurement. Moreover this factor may be used for individual calibration. Should, e.g. the preset count amount to 10,000 for an idealized oscillator (i.e. 50 sec. measuring time for water density for a resonant frequency of 200 c./s.) the same measuring time may be obtained for an oscillator of a different resonant frequency at the density of water by presetting the scaler within the range from 9,900 to 10,100, e.g., by presetting the numerical value which is adequate for a measuring time of 50 sec. during calibration. The accuracy of calibration which is obtained is the reciprocal value of the preset numerical value, which is about .01% at 10,000. This value should be sufficient for most industrial applications.

The apparatus of the present invention comprises a mechanical oscillator, a torsion oscillator, or the like which is designed as a vibrator and which is operatively connected with an apparatus for measuring the frequency and/or the duration of the oscillations by means of electromagnetic, electrodynamic or piezo-electric transducers, light-gate arrangements, or the like.

The determination of the density is reduced to a measurement of the resonant frequency of the mechanical oscillator which is filed with approximately 1 cm.$^3$ of the sample. The oscillator, most appropriately is made of glass and is excited electronically to an undamped oscillation, the frequency of which is dependent upon the mass of the oscillator and therefore upon the density of the sample. In case of precision measurements, the frequency determination is most favorably achieved by means of a digital counter in connection with a quartz-clock (crystal-controlled timer). For rough fast measurements an analog frequency meter can be used. In this case direct reading of the density on the meter is possible. The digital frequency determination allows density measurements with a relative accuracy of $10^{-6}$, and with the analog meter, an accuracy of $10^{-3}$. In order to shorten the measuring time to non-critical values concerning temperature changes, the resonant frequency is suitably scanned by a high frequency pattern which allows the scaling of portions to about 1/100 of one complete period. The measuring time for the digital output in this way amounts to about 30 seconds, and in case of an analog output, the instantaneous value can be read immediately. The oscillator is designed, such that the density of a flowing liquid and gas can be measured, respectively. In this case digital, as well as analog outputs, can be fed to a process control system and to a data recorder, respectively.

Most advantageously the elastic elements of the mechanical oscillator are formed in the shape of a rod or tube, respectively. A definite effective length of the oscillator is guaranteed by a distinct deviation of the equatorial momentum of inertia at the fixed ends (e.g. one or more deviations of the cross sections).

For an oscillator of this shape the relation for the undamped resonant frequency was deduced by Rawleigh:

$$\omega^2 = \frac{\int_0^2 EI\ddot{a}\left(\frac{d^2y}{dx^2}\right)^2 dx}{\int_0^2 F_1\rho_1 y^2 dx + \rho_2 \int_0^2 F_2 y^2 dx + My^2 + \rho_2 Vy^2}$$

in which $\omega$ is the undamped angular resonant frequency;
E is the modulus of elasticity at position $x$;
V is the volume of the hollow glass sphere;
$I\ddot{a}$ is the equatorial momentum of inertia at position $x$;
$y$ is the ordinate of the vibrating-elastic line;
$F_1$ is the cross section of the glass body at position $x$;
$F_2$ is the cross section of the liquid at position $x$;
$\rho_1$ is the density of the glass;
$\rho_2$ is the density of the liquid;
M is the mass of the hollow glass sphere;
$l$ is the length of the oscillator in the $x$-direction; and
$x$ is the coordinate in the direction of the vibrator axis.

Although the course of the vibrating elastic line is not known, one is in any case justified, to look at the integrals over the vibrating elastic line as constants. Thereby the relation above may be simplified to:

$$\omega^2 = \frac{A}{B + \rho_2 C} = \frac{1}{D + \rho_2 E}$$

Both constants D and E may be determined by means of two calibration measurements using samples of known densities (vacuum and water). The fundamental temperature dependency which requires an accurate thermostatization in case of precision measurements does not alter the principal relation between $\omega^2$ and $\rho$. The main part of the temperature dependency is due to the modulus of elasticity of the kind of glass used.

From the given relation for the resonant frequency one can see that over-filling the oscillator (i.e., filling the non-vibrating regions) is of no importance. This fact makes an exact determination of volume of the same unnecessary. Particularly, the determination of volume by traditional methods impedes the determination of the density, especially in case of viscous samples. For an exact measurement, continuous undamped oscillations must, of course, be maintained.

It is, therefore, still another object of the present invention to provide an apparatus for the determination of the density of substances of the highest accuracy possible, which apparatus can measure very small quantities of substances (of the order of 1 cm.³) and viscous solutions, wherein an excitation amplifier is provided in the feed back loop in which the oscillator is provided with two electro-mechanical transducers.

In order to stabilize the amplitude of the mechanical oscillator the excitation amplifier contains two diodes (esp. germanium diodes) or other voltage-dependent resistors, connected in antiparallel arrangement, constituting limiters.

Figure 2:
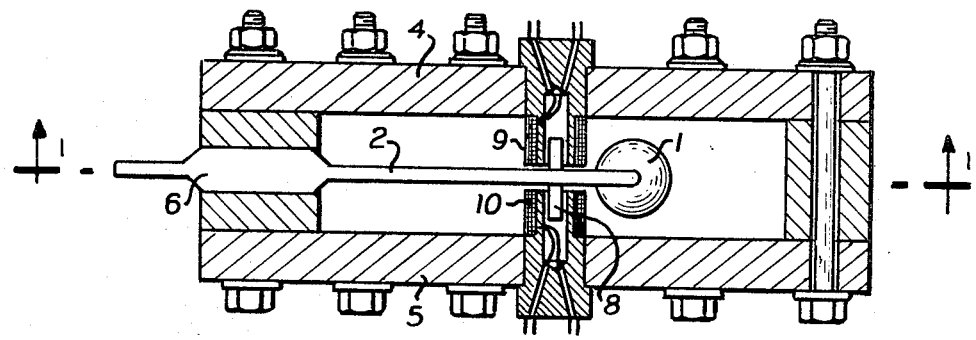
Figure 3:
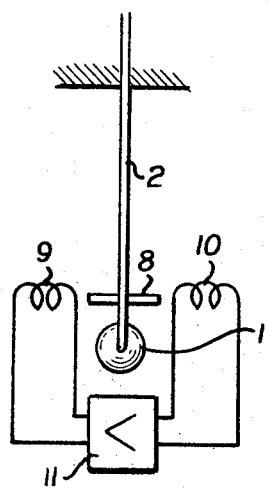
Figure 5:
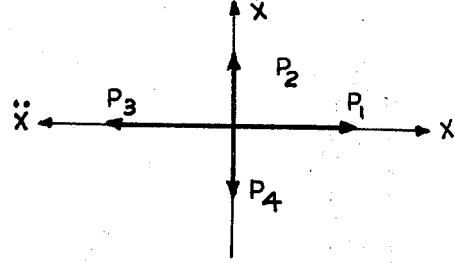
Figure 6:
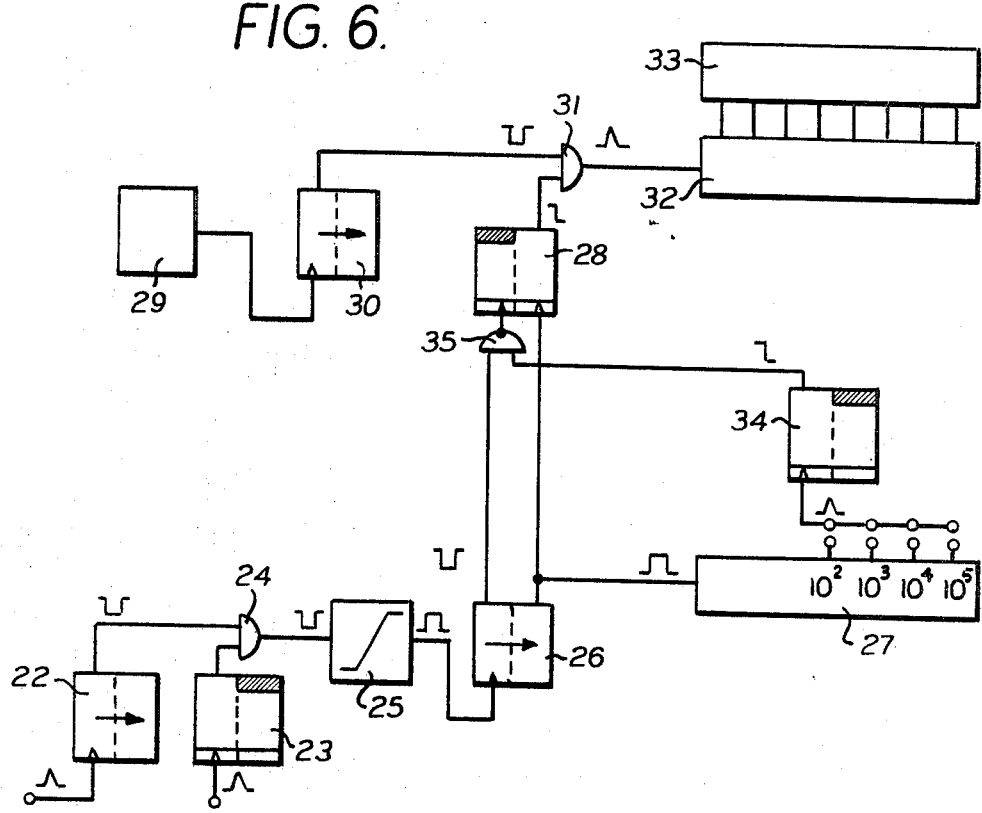

With these and other objects in view which will become apparent in the following detailed description, the present invention will be clearly understood in connection with the accompanying drawings, in which:

FIG. 1 is a section of an oscillator, along the lines 1—1, of FIG. 2;
FIG. 2 is a section, along the lines of 2—2, of FIG. 1;
FIG. 3 is a diagrammatic elevation of the oscillator;
FIG. 4 is a circuit diagram of the excitation oscillator;
FIG. 5 is a vector diagram; and
FIG. 6 is a block diagram of a digital densimeter.

Referring now to the drawings, and in particular to FIGS. 1 and 2, the mechanical vibrator oscillator comprises a glass hollow sphere 1 of a volume of approximately 1 cm.³, which is connected with an inlet-pipe 2 and an outlet pipe 3, for filling and emptying, respectively, the hollow sphere 1. The inlet and outlet pipes 2 and 3 form elastic tube-like spring elements, and are each secured at one end between two cover plates 4 and 5. In order to guarantee a defined effective length of the elastic elements, the diameters of the inlet and outlet pipes are enlarged at the fixed ends 6 and 7. The elastic elements, namely the inlet and outlet pipes, are arranged in a V-shape manner to provide a defined plane of vibration. The hollow sphere 1 is disposed at the apex of the V-shape.

Attached to the oscillator is a small rod-like, permanent magnet 8, which can be inserted into two opposed coils 9 and 10. As may be seen in FIG. 3, coil 9, constituting a pick-up coil, is connected to coil 10, constituting a driver coil, via excitation amplifier 11.

When the mechanical oscillator vibrates, a voltage is generated in the pick-up coil 9, which is in phase with the amplitude of the velocity of the oscillator. This voltage is amplified by the excitation amplifier 11 and is fed to the driver coil 10, taking into account the phase relations. In this manner the excitation amplifier 11 is provided with a feed back from driver movements of the mechanical oscillator. The voltage gain of the excitation amplifier 11 (appr. 60 db) must certainly surpass the attenuation of the four-poles formed by the oscillator and its two transducers (about —40 db at the lowest resonant frequency) to permit the commencement of oscillation. Since this margin of gain would allow the amplitude of the mechanical oscillator to rise to a non-permissible high degree, two germanium diodes are connected in anti-parallel arrangement in the excitation amplifier 11 (FIG. 4) in order to limit the exciting voltage. This measure stabilizes the mechanical amplitude of the oscillator to a value of the order of a few hundredths of a mm. The harmonics arising therefrom do not cause any measurable error in the resonant frequency, as compared with the harmonic spectrum which is obtained by overloading the amplifier, in order to limit the excitation voltage. Harmonics of too high a level could in any case excite mechanical harmonics in the oscillator which would introduce a considerable error in the measuring results. In the region of small amplitudes one can assume that the resonant frequency of the oscillator is independent of its amplitude. Each phase shift within the electrical system, however, alters the oscillating frequency as each deviation from the velocity which is proportional to the excitation would amount to a change of the mass of the oscillator.

Therefore, the excitation amplifier 11 is designed as a D.C. coupled differential amplifier, as may be seen in FIG. 4. The signal from the pick-up coil 9 is fed into an input stage 14 comprising a differential amplifier and containing symmetrical dual transistors BCY 55. The emitter current to this stage is delivered by a constant current source 15. The input stage 14 is followed by another differential amplifier 16, which is followed by an inverting transistor 17. The limiting diodes 12 and 13 and the driver coil 10 are connected to the load resistance 18 of the inverting transistor 17. A feed back loop 19 sends a signal from the driver coil 10 into the inverting input of the input stage 14 and determines the voltage gain of the amplifier. A signal is taken from the inverting transistor 20 in order to control a frequency meter, which signal is initially fed to a Schmitt-trigger 21. The output of the latter is connected directly with the input of a digital measuring apparatus shown in FIG. 6. Alternately, one could use an analog frequency meter, which meter could be calibrated in density values. For this purpose, pulses of constant width are derived from the signal from the Schmitt-trigger 21, which signals are integrated by the meter.

The vector diagram (FIG. 5) shows the forces effecting the oscillator with respect to their phase relationships.

In the direction of the amplitude $x$, the elastic force $P_1 = cA$ is plotted, wherein $c$ is the constant of elasticity and $A$ is the amplitude. The damping force $P_2 = b.A.\omega$ is plotted in the direction of the velocity $\dot{x}$ (where $b$ is the damping constant, and $\omega$ is the angular frequency). The inertia, $P_3 = a.A.\omega^2$, is plotted in the direction of the acceleration $\ddot{x}$, (where $a$ is the mass). The vector $P_4$ represents the damping compensating force.

The conditions of equilibrium for inertia and elasticity lead to the well known formula for the angular frequency of an undamped oscillator:

$$\omega = \sqrt{\frac{c}{a}}$$

The condition of equilibrium for the damping force adn the undamping force provides the relation $$P_4 = \text{constant} = b.A.\omega$$

Since one can assume the damping to be proportional to $1/\omega$, it can be concluded that in case of constant excitation the amplitude is primarily independent of the resonant frequency. Measurements at various resonant frequencies (with samples of various densities) proved the correctness of this assumption.

Furthermore, as can be seen from the vector diagram, each deviation of the exciting amplitude from the correct phase relation introduces an imaginary deviation of mass, as the vector $P_4$ in this case contributes a component in the direction of inertia. This fact demands an extremely flat phase response.

FIG. 6 shows a block diagram of a digital measuring device.

The input is formed by a single pulse element 22 which is connected together with a flip-flop 23 delivering a start signal to an AND-gate 24, the output of which is connected to another single pulse element 26 via a Schmitt-trigger 25. The output signal of this single pulse element 26 is fed on one hand to a presettable counter 27; and on the other hand, to a flip-flop 28. The output of the latter controls an AND-gate 31. The second input of gate 31 is connected to a crystal-controlled oscillator 29 via a single pulse element 30 and the output of gate 31 is connected to timer 32 having a number-display 33. Furthermore, the single-pulse element 26 is connected together with a flip-flop 34 (set by the scaler 27) to the inputs of AND-gate 35, the output of which leads to the flip-flop 28.

The input signal is formed as negative pulses of 4 micro-seconds in duration in the mono-stable single pulse element 22. It triggers the single pulse element 26 via the AND-gate 24 and the Schmitt-trigger 25. A start signal is provided at the flip-flop 23. In case of coincidence of a start pulse and an input signal, the Schmitt-trigger 25 determines whether the start signal was on time or not. The leading edge of the output signal of the single pulse element 26 sets the flip-flop 28 in a position which causes the timer 32 to operate. On the other hand, the same signal is fed to a 5 digit counter 27 which can be preset. In this manner it is guaranteed that the first pulse scaled in the counter 27 operates the timer gate 31. The clock pulses run via the timer gate 31 into the 8 digit scaler 32 having the display 33. The preset pulse of the scaler 27 sets the flip-flop 34 to a position which causes one input of gate 35 to rise to a high level.

After another period of the oscillator the next input pulse resets the flip-flop 28 which stops the timer. From the number indicators one can read the time necessary for a certain number of oscillator periods. The storage of the last single input pulse (which appears at the beginning of the last period of the oscillator in the flip-flop 34) avoids the long time delay in the scaler 27. In this way it is possible to stop the timer within a micro-second after the leading edge of the last input pulse.

If T represents the values displayed on the number indicators, the above-mentioned relation $$\omega^2 = \frac{1}{D + \rho E}$$

may be transformed into $$T_1^2 - T_2^2 = F(\rho_1 - \rho_2)$$

The apparatus constant F can be determined by calibration with two samples of known density.

The following example indicates the order of the several parameters, as well as the accuracy obtained with the present invention. The specific weight of acetone was determined by using the known densities of air and water. The temperature during the measurement was stabilized to about 20.2 degrees centigrade by an ultra-thermostat. The present count rate was 20,000, and the crystal frequency was 10,000 c./s. ($10^4$ sec.$^{-1}$). The following T-values resulted:

Air—972 774
Water—1 412 983
Acetone—1 333 286

The measuring times therefor were 97, 141, and 133 sec., respectively.

According to the above-mentioned relation, the constant F was calculated to 1 053 385·$10^6$ cm.$^3$g.$^{-1}$sec$^2$ and the difference in density between water and acetone to −0.207776 g./cm.$^3$. The density of acetone was 0.790388 g./cm.$^3$. This result is in accordance with earlier published measurements up to the fourth significant figure. For the last two figures there is no comparison as no method is nown by the inventors for obtaining this degree of accuracy.

The present invention is not limited to the disclosed examples of application. The transformation of the mechanical oscillations into electrical voltages could be obtained for example by a photoelectrical device or the like. Also frequency measurements can be done by all known methods.

While we have disclosed several embodiments of the present invention, it is to be understood that these embodiments are given by example only and not in a limiting sense.

We claim:
1. An apparatus for the determination of mass and density, respectively, particularly of liquids and gases by the determination of the resonant frequency of a mechanical oscillator formation containing therein the mass of the object to be measured, comprising
    a mechanical oscillator including V-shaped elasticity elements and supporting at its apex a hollow means for containing the mass of the object to be measured,
    a magnetic body disposed on said oscillator,
    two coils in the field of said magnetic body,
    an excitation amplifier connecting together said two coils,
    said excitation amplifier including circuit means for keeping the amplitude of said mechanical oscillator constant and comprising a D.C. coupled differential amplifier, and
    said excitation amplifier including a feed back loop constituting one of said coils operative on said excitation amplifier by means of said mechanical oscillator for maintaining constant the amplitudes of said mechanical oscillator, said D.C. coupled differential amplifier providing high phase linearity.

2. The apparatus, as set forth in claim 1, wherein
    said differential amplifier has at its output two anti-parallel connected germanium diodes, in order to limit and stabilize the mechanical amplitude of said mechanical oscillator and to maintain harmonics at a low level.

3. The apparatus, as set forth in claim 2, which includes
    a digital counting device for the precise measuring of the oscillation period of said mechanical oscillator, and
    said digital counting device comprises a frequency generator, two digital counters, a counter input gate operatively connected between said frequency generator and one of said digital counters and said other of said digital counters operatively connected to the input of said counter input gate, and an indicator device connected to said one of said digital counters, such that, at a predetermined passage of said mechanical oscillator through a neutral position, said counter input gate is opened and time synchronous pulses feed from said frequency generator into said one of said digital counters and said counter input gate is closed again after a number of periods of said mechanical oscillator pre-selected on the other of said digital counters.

4. The apparatus, as set forth in claim 3, wherein
    said frequency generator comprises a crystal-controlled oscillator, the resonant frequency of which is at least higher by two orders than the resonant frequency of said mechanical oscillator.

References Cited

UNITED STATES PATENTS

| | | | |
|---|---|---|---|
| 2,889,702 | 6/1959 | Brooking | 73—32 |
| 2,943,476 | 7/1960 | Bernstein | 73—32 |
| 3,339,400 | 9/1967 | Banks | 73—32 |

JAMES J. GILL, Primary Examiner

J. K. LUNSFORD, Assistant Examiner